(12) United States Patent
R

(10) Patent No.: US 11,657,356 B2
(45) Date of Patent: *May 23, 2023

(54) SYSTEM AND METHOD FOR AUTOMATIC PARAMETER TUNING OF CAMPAIGN PLANNING WITH HIERARCHICAL LINEAR PROGRAMMING OBJECTIVES

(71) Applicant: Blue Yonder Group, Inc., Scottsdale, AZ (US)

(72) Inventor: Devanand R, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,808

(22) Filed: Apr. 25, 2022

(65) Prior Publication Data

US 2022/0253782 A1 Aug. 11, 2022

Related U.S. Application Data

(63) Continuation of application No. 16/510,302, filed on Jul. 12, 2019, now Pat. No. 11,315,059.

(Continued)

(51) Int. Cl.
*G06Q 10/0637* (2023.01)
*G06Q 50/28* (2012.01)
(Continued)

(52) U.S. Cl.
CPC . *G06Q 10/06375* (2013.01); *G06F 16/90344* (2019.01); *G06Q 10/06315* (2013.01); *G06Q 10/06393* (2013.01); *G06Q 50/28* (2013.01)

(58) Field of Classification Search
CPC ............ G06F 1/00–40/00; G06Q 10/00–50/00
(Continued)

(56) References Cited

U.S. PATENT DOCUMENTS 7,117,130 B1 * 10/2006 Megiddo .............. G05B 13/024
703/2
8,965,548 B1 * 2/2015 Kamath ........... G06Q 10/06315
700/100
(Continued)

OTHER PUBLICATIONS

S. Mannor et al., "The cross entropy method for fast policy search," in Proceedings of the 20th International Conference on Machine Learning (ICML-03), 2003, pp. 512-519.
(Continued)

*Primary Examiner* — Alan S Miller
(74) *Attorney, Agent, or Firm* — Spencer Fane LLP; Steven J. Laureanti

(57) ABSTRACT

A system and method are disclosed for campaign planning and include modeling the use of campaign operations and campaignable resources of a supply chain network including a production line to produce products using campaign operations and campaignable resources as campaign planning problems, defining an evaluation function comprising a weighted sum of features evaluated from the campaign planning problem, initializing weights to build a consumption profile and evaluation function, determining fitness values that indicate a level of variability, evaluating reward values based on the fitness values, selecting a sub-sample of the top fitness values having the best associated objective function, repeating the generating, the evaluating and the selecting steps to adjust the weights until a stopping criterion is met indicating an optimal solution has been reached, and determining a campaign plan for the use of the campaign operations and campaignable resource.

20 Claims, 9 Drawing Sheets

Related U.S. Application Data

(60) Provisional application No. 62/741,922, filed on Oct. 5, 2018.

(51) Int. Cl.
  *G06Q 10/0639* (2023.01)
  *G06F 16/903* (2019.01)
  *G06Q 10/0631* (2023.01)

(58) Field of Classification Search
  USPC .............................................. 705/7.11–7.42
  See application file for complete search history.

(56) References Cited

U.S. PATENT DOCUMENTS

| | | | | |
|---|---|---|---|---|
| 9,785,900 | B2* | 10/2017 | Kamath | G06Q 10/06315 |
| 10,068,192 | B2 | 9/2018 | Kamath et al. | |
| 2003/0018513 | A1* | 1/2003 | Hoffman | G06Q 10/06393 |
| | | | | 705/28 |
| 2004/0068501 | A1* | 4/2004 | McGoveran | G06Q 30/06 |
| | | | | 714/E11.131 |
| 2005/0234579 | A1* | 10/2005 | Asmundsson | G06Q 10/06 |
| | | | | 700/99 |
| 2007/0087756 | A1* | 4/2007 | Hoffberg | G06Q 10/06375 |
| | | | | 455/450 |
| 2011/0078211 | A1* | 3/2011 | Gass | G06F 8/65 |
| | | | | 707/E17.044 |
| 2011/0296391 | A1* | 12/2011 | Gass | G06F 8/72 |
| | | | | 717/168 |
| 2012/0035984 | A1* | 2/2012 | Gorur Narayana Srinivasa | |
| | | | | G06Q 10/06375 |
| | | | | 705/7.35 |
| 2013/0185039 | A1* | 7/2013 | Tesauro | G06Q 10/063 |
| | | | | 703/6 |
| 2014/0249882 | A1* | 9/2014 | Li | G06Q 10/06313 |
| | | | | 705/7.23 |
| 2015/0170083 | A1* | 6/2015 | Kamath | G06Q 10/0875 |
| | | | | 705/7.25 |
| 2016/0048853 | A1* | 2/2016 | Bhattacharjya | G06Q 30/0202 |
| | | | | 705/7.31 |
| 2017/0090892 | A1* | 3/2017 | Gass | G06F 8/76 |
| 2018/0032937 | A1* | 2/2018 | Kamath | G06Q 10/06315 |

OTHER PUBLICATIONS

M. Nielson, "Improving the way neural networks learn," http://neuralnetworksanddeeplearning.com/chap3.html#introducing_the_cross-entropy_cost_function, 2017.

P.T. De Boer et al., "A tutorial on the cross-entropy method," Annals of operations research, vol. 134, No. 1, pp. 19-67, 2005.

H. Jahandideh et al., "Production campaign planning under learning and decay," 2016, 41 pages.

David Peidro et al., "A fuzzy linear programming based approach for tactical supply chain planning in an uncertainty environment," European Journal of Operational Research 205.1 (2010): pp. 65-80.

Young Chun, "Multi-attribute sequential decision problem with optimizing and satisficing attributes." European Journal of Operational Research 243.1 (2015): 224-232. (Year: 2015).

Fernando D Mele et al. "A simulation-based optimization framework for parameter optimization of supply-chain networks." Industrial & Engineering Chemistry Research 45.9 (2006): 3133-3148. (Year: 2006).

Guiping Hu. "Decision Models for Sustainable Manufacturing Systems," Diss. University of Pittsburgh, 2009.

Pierrick Plamondon, "Techniques for the allocation of resources under uncertainty." (2007). (Year: 2007).

Kaijen Hsiao et al., "Robust grasping under object pose uncertainty." Autonomous Robots 31.2-3 (2011): 253. (Year: 2011).

Manoj Kumar et al., "A fuzzy programming approach for vendor selection problem in a supply chain." International Journal of Production Economics 101.2 (2006): 273-285. (Year: 2006).

Liang Liang, et al. "DEA models for supply chain efficiency evaluation." Annals of Operations Research 145.1 (2006): 35-49. (Year: 2006).

* cited by examiner

| KPI | | | EXPERT-BASED SELECTION | | | | CE-BASED SELECTION | | | |
|---|---|---|---|---|---|---|---|---|---|---|
| | | | LAYER | | | | LAYER | | | |
| | | | 1 | 2 | 3 | 4 | 1 | 2 | 3 | 4 |
| amt_not_satisfied | | Band1 | -72840 | -142764 | -227390.4 | -319020 | -72840 | -143732 | -227971.2 | -321040 |
| | | Band2 | -48560 | -93280 | -128800 | -209500 | -48560 | -93280 | -128800 | -211476 |
| | | Band3 | -48560 | -92968 | -128800 | -208790 | -48560 | -93280 | -128800 | -209748.5 |
| | | band4 | -72840 | -105049.7 | -192713 | -276372 | -72840 | -113280 | -193200 | -289218.5 |
| BACKLOG | | Band1 | 706 | 347990.2 | 6715348 | 1151327.4 | 706 | 338857.9 | 614244.5 | 1124098.3 |
| | | Band2 | 1600.0 | 266777.5 | 96489.6 | 819770.3 | 1600 | 217486.5 | 69042.4 | 967667.6 |
| | | Band3 | 1652 | 338560.3 | 125842.6 | 963397.4 | 1652 | 270589.7 | 105338.1 | 1078958.1 |
| | | Band4 | 6516 | 501160.3 | 266590.5 | 1548262.6 | 5725 | 459457.4 | 233818.6 | 1765538.1 |
| ALTERNATES | | no_demand_op_plans | | | 14.657 | | | | 18.88 | |
| | | buffer.group (RE_PLT) | | | 4659611.9759 | | | | 4723734.6384 | |
| simple_inventory | | buffer.group (OE_PLT) | | | 213674.205 | | | | 285028.729 | |
| | | | | | 255423.473 | | | | 297188.76933 | |
| op_earliness | | | | | 8647957772.302118 | | | | 883544817.091 | |
| INVENTORY | | | | | 1488542.3102 | | | | 2431359.4241 | |

SYSTEM AND METHOD FOR AUTOMATIC PARAMETER TUNING OF CAMPAIGN PLANNING WITH HIERARCHICAL LINEAR PROGRAMMING OBJECTIVES

CROSS-REFERENCE TO RELATED APPLICATIONS

This application is a continuation of U.S. patent application Ser. No. 16/510,302, filed on Jul. 12, 2019, entitled "System and Method for Automatic Parameter Tuning for Campaign Planning with Hierarchical Linear Programming Objectives," which claims the benefit under 35 U.S.C. § 119(e) to U.S. Provisional Application No. 62/741,922, filed Oct. 5, 2018, entitled "System and Method for Automatic Parameter Tuning for Campaign Planning with Hierarchical Linear Programming Objectives." U.S. patent application Ser. No. 16/510,302 and U.S. Provisional Application No. 62/741,922 are assigned to the assignee of the present application. The subject matter disclosed in U.S. patent application Ser. No. 16/510,302 and U.S. Provisional Application No. 62/741,922 is hereby incorporated by reference into the present disclosure as if fully set forth herein

TECHNICAL FIELD

The present disclosure relates generally to supply chain management and specifically to systems and methods for automatic parameter tuning of campaign planning with hierarchical linear programming objectives.

BACKGROUND

A supply chain for manufactured items typically involves the procurement of raw materials, transforming the raw materials into finished goods, and preparing the finished goods for distribution to warehouses, retailers, and customers. A supply chain planner determines the flow and distribution of items in the supply chain to meet a demand for the finished goods, while ensuring compliance with business objectives and constraints. In addition, manufacturing operations face resource constraints where certain resources, referred to as campaignable resources, require significant setup times or costs between different operations.

However, formulating a supply chain plan that includes campaignable resources requires the use of one or more iterative heuristic solving techniques that use manually-selected parameters for evaluating campaign selections. Although these manually-selected parameters greatly influence the overall solution output, current methods are unable to calculate these values, and therefore, these values are instead left up to users' intuition. Deciding these parameters manually, based on a users' intuition, is not effective for campaign planning problems and a user cannot determine whether changes to the parameters would improve the solution output. In addition, the iterative process of testing changes to the parameters and re-solving the campaign planning problem often leads to local solutions with poor plan quality and high computation time. The inability to efficiently calculate parameter values that are suitable for evaluating campaign selections is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 9 illustrates a chart comparing expert-based weight selection and cross-entropy-based weight selection for production planning using big bucket campaign planning of an exemplary dataset representing a global supply chain network, according to an embodiment.

DETAILED DESCRIPTION

Figure 1:
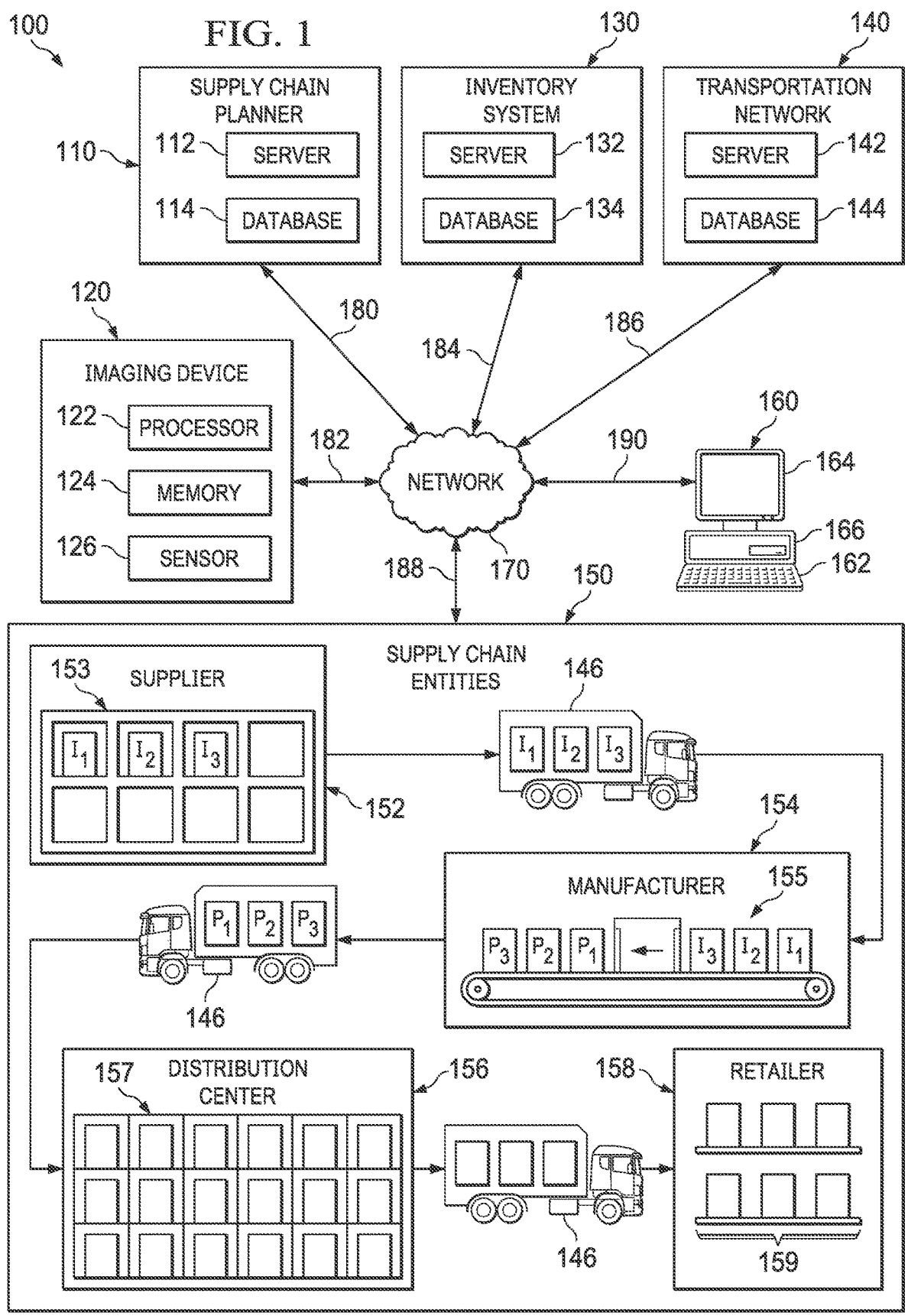
FIG. 1 illustrates an exemplary supply chain network, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, the following disclosure describes the process of learning values for campaign planning parameters based on iterative learning using cross-entropy techniques to determine and evaluate a plan for one or more campaignable resources using a combination of LP and heuristic processes.

FIG. 1 illustrates exemplary supply chain network 100, according to an embodiment. Supply chain network 100 comprises supply chain planner 110, one or more imaging devices 120, inventory system 130, transportation network 140, one or more supply chain entities 150, computer 160, network 170, and communication links 180-190. Although a single supply chain planner 110, one or more imaging devices 120, a single inventory system 130, a single transportation network 140, one or more supply chain entities 150, a single computer 160, and a single network 170 are shown and described, embodiments contemplate any number of supply chain planners, imaging devices, inventory systems, transportation systems, supply chain entities, computers, or networks, according to particular needs.

In one embodiment, supply chain planner 110 comprises server 112 and database 114. Server 112 comprises one or more modules to model, generate, and solve supply chain planning problems. Server 112 of supply chain planner 110 may comprise one or more engines or solvers that generate a supply chain planning problem based on a model representing supply chain network 100. One or more solvers comprise one or more LP solvers and/or heuristic solvers for solving one or more supply chain master planning problems of supply chain network 100. One or more solvers may comprise one or more campaign planners or engines that solve one or more types of campaign planning problems. The one or more campaign planners or engines may be referred to herein as a campaign planner 206, as discussed in more detail in FIG. 2. According to embodiments, campaign planner 206 of supply chain planner 110 models the one or more campaign planning problems as a sequential decision problem with well-defined decision parameters and encode the required policy of the sequential decision problem into a k-lookahead search strategy by defining a user-specific evaluation function, comprising a weighted sum of features evaluated from the campaign planning problem itself. The one or more solvers may then use a cross-entropy method to learn the weights associated with the evaluation function that frames an effective objective function to formulate campaign planning as a linear programming problem and solve for the parameters of the weighted consumption profile. The disclosed cross-entropy method for identifying the weights of an evaluation function for solving campaign planning problems may initiate parallel campaign planning solves as disclosed below to reduce the amount of time for determining the weights of the evaluation function.

For a manufacturing facility, the supply chain planning problems comprise limitations which restrict products manufactured on demand. For example, during campaign planning, the limitation may comprise a manufacturing process with resource constraints, where certain resources require setups to support multiple operations. Such types of situations occur in manufacturing systems which produce similar type of products with minor changes. According to embodiments, campaign refers to manufacturing in lots such as for example, manufacture a lot once every month at particular scheduled dates, manufacture a lot every week at particular scheduled dates, and the like. Manufacturing in a lot requires setup time to switch from production of a lot of one item to production of a lot of another item. A major issue in such decisions is to determine when to campaign and how much to campaign. As an example only and not by way of limitation, in an example, where campaignable resources include soft drink bottling machinery, molding and curing equipment, and equipment used with batch or continuous processing of lots with differing compositions. In this example, soft drink bottling machinery may require setup times between processing different lots of drink flavors or different lots of bottle sizes. Likewise, in this example, molding and curing equipment process various molded items (e.g. tires, toys, and the like) using interchangeable custom molds.

Setups are performed to remove a mold from the equipment and replace it with a different mold, which enables the equipment to process a lot of a different items. Batch process or continuous process equipment may also require setups to prevent contamination when switching between production lots having different compositions. For example, when producing different colors of paint or glass, a setup may require cleaning equipment to prevent the color of a lot of a previously-produced product from discoloring lots of subsequently produced products. Because the time required to perform setups can be long and sequence-dependent, when setups are not accounted for during master planning, the plan becomes infeasible during scheduling, which may increase backlog or shortage. On the other hand, when master planning takes setups into account, discrete constraints are introduced, which changes the linear programming (LP) problem into a mixed integer programming (MIP) problem or a mixed integer nonlinear programming (MINLP) problem, which may not be solvable using LP solvers.

Generally, campaign quantity and frequency are predicted and decided based, at least in part, on forecasted demand between campaigns. This, however, leads to the trade-off at ong three main key performance indices (KPIs) namely, customer service level, resource utilization and inventory level. The customer service level KPI, resource utilization KPI, and inventory level KPI, look for full demand satisfaction, productive utilization of resources, and minimization of build ahead inventory, respectively. Campaign planning determines when to change from one campaign to another and how long to run each campaign while balancing these three KPIs.

One or more imaging devices 120 comprise one or more processors 122, memory 124, one or more sensors 126, and may include any suitable input device, output device, fixed or removable computer-readable storage media, or the like. According to embodiments, one or more imaging devices 120 comprise an electronic device such as, for example, a mobile handheld electronic device such as, for example, a smartphone, a tablet computer, a wireless communication device, and/or one or more networked electronic devices configured to image items using sensor 126 and transmit product images to one or more databases.

According to embodiments, one or more imaging devices 120 identify items near one or more sensors 126 and generate a mapping of the item in supply chain network 100. As explained in more detail below, one or more transportation networks 140 and/or one or more supply chain entities 150 use the mapping of an item to locate the item in supply chain network 100. The location of the item be used to coordinate the storage and transportation of items in supply chain network 100 according to one or more plans generated by supply chain planner 110 and/or a reallocation of materials or capacity, as described in more detail below. Plans may comprise one or more of production plans, distribution plans, supply chain master plans, campaign plans, or the like.

One or more imaging devices 120 may generate a mapping of one or more items in supply chain network 100 by scanning an identifier or object associated with an item and identifying the item based, at least in part, on the scan. This may include, for example, a stationary scanner located at inventory system 130, transportation network 140, and/or one or more supply chain entities 150 that scans items as the items pass near the scanner including in one or more transportation vehicles 146.

One or more sensors 126 of one or more imaging devices 120 may comprise an imaging sensor, such as, a camera, scanner, electronic eye, photodiode, charged coupled device (CCD), or any other electronic component that detects visual characteristics (such as color, shape, size, or the like) of objects. In addition, or as an alternative, one or more sensors may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or other like identifiers. One or more imaging devices 120 may generate a mapping of one or more items in supply chain network 100 by scanning an identifier or object associated with an item and identifying the item based, at least in part, on the scan. This may include, for example, a stationary scanner located at one or more supply chain entities 150 that scans items as the items pass near the scanner. As explained in more detail below, supply chain planner 110, one or more imaging devices 120, inventory system 130, and transportation network 140 may use the mapping of an item to locate the item in supply chain network 100.

Additionally, one or more sensors 126 of one or more imaging devices 120 may be located at one or more locations local to, or remote from, one or more imaging devices 120, including, for example, one or more sensors 126 integrated into one or more imaging devices 120 or one or more sensors 126 remotely located from, but communicatively coupled with, one or more imaging devices 120. According to some embodiments, one or more sensors 126 may be configured to communicate directly or indirectly with supply chain planner 110, one or more imaging devices 120, inventory system 130, transportation network 140, one or more supply chain entities 150, computer 160, and/or network 170 using one or more communication links 180-190.

Inventory system 130 comprises server 132 and database 134. Server 132 of inventory system 130 is configured to receive and transmit item data, including item identifiers, pricing data, attribute data, inventory levels, and other like data about one or more items at one or more locations in supply chain network 100. Server 132 stores and retrieves item data from database 134 or from one or more locations in supply chain network 100.

Transportation network 140 comprises server 142 and database 144. According to embodiments, transportation network 140 directs transportation vehicles 146 to ship one or more items between one or more supply chain entities 150, based, at least in part, on a supply chain plan, including a supply chain master plan and/or a campaign plan, the number of items currently in stock at one or more supply chain entities 150, the number of items currently in transit in transportation network 140, a forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may receive and transmit radio, satellite, or other communication to communicate location information (such as, for example, geographic coordinates, distance from a location, global positioning satellite (GPS) information, or the like) with supply chain planner 110, one or more imaging devices 120, inventory system 130, transportation network 140, and/or one or more supply chain entities 150 to identify the location of transportation vehicles 146 and the location of any inventory or shipment located on transportation vehicles 146.

As shown in FIG. 1, supply chain network 100 comprising supply chain planner 110, one or more imaging devices 120, inventory system 130, transportation network 140, and one or more supply chain entities 150 may operate on one or more computers 160 that are integral to or separate from the hardware and/or software that support supply chain planner 110, one or more imaging devices 120, inventory system 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from supply chain planner 110, one or more imaging devices 120, inventory system 130, transportation network 140, and one or more supply chain entities 150. In addition, each of the one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with supply chain planner 110, one or more imaging devices 120, inventory system 130, transportation network 140, and one or more supply chain entities 150. These one or more users may include, for example, a "manager" or a "planner" handling supply chain planning, campaign planning, and/or one or more related tasks within the system. In addition, or as an alternative, these one or more users within the system may include, for example, one or more computers 160 programmed to autonomously handle, among other things, one or more supply chain processes such as demand planning, supply and distribution planning, inventory management, allocation planning, order fulfilment, adjustment of manufacturing and inventory levels at various stocking points, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on a supply chain plan, including a supply chain master plan and/or a campaign plan, the number of items currently in stock at one or more supply chain entities 150, the number of items currently in transit in transportation network 140, forecasted demand, a supply chain disruption, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on a supply chain plan, including a supply chain master plan and/or a campaign plan, the number of items currently in stock at one or more supply chain entities 150, the number of items currently in transit in transportation network 140, forecasted demand, a supply chain disruption, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on a supply chain plan, including a supply chain master plan and/or a campaign plan, the number of items currently in stock at one or more supply chain entities 150, the number of items currently in transit in transportation network 140, forecasted demand, a supply chain disruption, and/or one or more other factors described herein.

Retailers 158 may be any suitable entity that obtains one or more products to sell to one or more customers. Retailers 158 may comprise any online or brick-and-mortar store, including stores with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158 and which may be based, at least in part, on a supply chain plan, including a supply chain master plan and/or a campaign plan, the number of items currently in stock at one or more supply chain entities 150, the number of items currently in transit in transportation network 140, forecasted demand, a supply chain disruption, and/or one or more other factors described herein.

Although one or more supply chain entities 150 are shown and described as separate and distinct entities, the same entity may simultaneously act as any one of one or more supply chain entities 150. For example, one or more supply chain entities 150 acting as a manufacturer 154 can produce a product, and the same one or more supply chain entities can act as a supplier 152 to supply an item to itself or another of one or more supply chain entities 150. Transportation network 140 may direct transportation vehicles 146 to ship one or more items between one or more supply chain entities 150. Inventory of products stocked at one or more supply chain entities 150 may be managed by an inventory system that receives and transmits item data, including item identifiers, pricing data, attribute data, inventory levels, and other like data about one or more items comprising one or more products at one or more locations in supply chain network 100. Although one example of supply chain network 100 is shown and described, embodiments contemplate other configurations of supply chain network 100, without departing from the scope described herein.

In one embodiment, supply chain planner 110 may be coupled with network 170 using communication link 180, which may be any wireline, wireless, or other link suitable to support data communications between supply chain planner 110 and network 170 during operation of supply chain network 100. One or more imaging devices 120 may be coupled with network 170 using communication link 182, which may be any wireline, wireless, or other link suitable to support data communications between one or more imaging devices 120 and network 170 during operation of supply chain network 100. Inventory system 130 may be coupled with network 170 using communication link 184, which may be any wireline, wireless, or other link suitable to support data communications between inventory system 130 and network 170 during operation of supply chain network 100. Transportation network 140 may be coupled with network 170 using communication link 186, which may be any wireline, wireless, or other link suitable to support data communications between transportation network 140 and network 170 during operation of supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. Computer 160 may be coupled with network 170 using communication link 190, which may be any wireline, wireless, or other link suitable to support data communications between computer 160 and network 170 during operation of supply chain network 100.

Although communication links 180-190 are shown as generally coupling supply chain planner 110, one or more imaging devices 120, inventory system 130, transportation network 140, one or more supply chain entities 150, and computer 160 to network 170, any of supply chain planner 110, one or more imaging devices 120, inventory system 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, one or more imaging devices 120, inventory system 130, transportation network 140, one or more supply chain entities 150, and computer 160. For example, data may be maintained locally to, or externally of, supply chain planner 110, one or more imaging devices 120, inventory system 130, transportation network 140, one or more supply chain entities 150, and computer 160 and made available to one or more associated users of supply chain planner 110, one or more imaging devices 120, inventory system 130, transportation network 140, one or more supply chain entities 150, and computer 160 using network 170 or in any other appropriate manner. For example, data may be maintained in a cloud database at one or more locations external to supply chain planner 110, one or more imaging devices 120, inventory system 130, transportation network 140, one or more supply chain entities 150, and computer 160 and made available to one or more associated users of supply chain planner 110, one or more imaging devices 120, inventory system 130, transportation network 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may generate a supply chain plan, including a supply chain master plan and/or a campaign plan. Furthermore, supply chain planner 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on a supply chain plan, including a supply chain master plan and/or a campaign plan, the number of items currently in the inventory one or more supply chain entities 150, the number of items currently in transit in transportation network 140, forecasted demand, a supply chain disruption, and/or one or more other factors described herein. For example, the methods described herein may include computers 160 receiving product data 222 (FIG. 2) from automated machinery having at least one sensor 126 and product data 222 corresponding to an item detected by the automated machinery. Received product data 222 may include an image of the item, an identifier, and/or other product information associated with the item (dimensions, texture, estimated weight, fill level, and the like). The method may further include computers 160 looking up the received product data 222 in database 114 associated with supply chain planner 110 to identify the item corresponding to product data 222 received from the automated machinery.

Computers 160 may also receive, from one or more sensors 126 of one or more imaging devices 120, a current location of the identified item. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, as least in part, on one or more differences between the first mapping and the second mapping such as, for example, to produce items, locate items to add to or remove from an inventory of or package for one or more supply chain entities 150, or the like.

Figure 2:
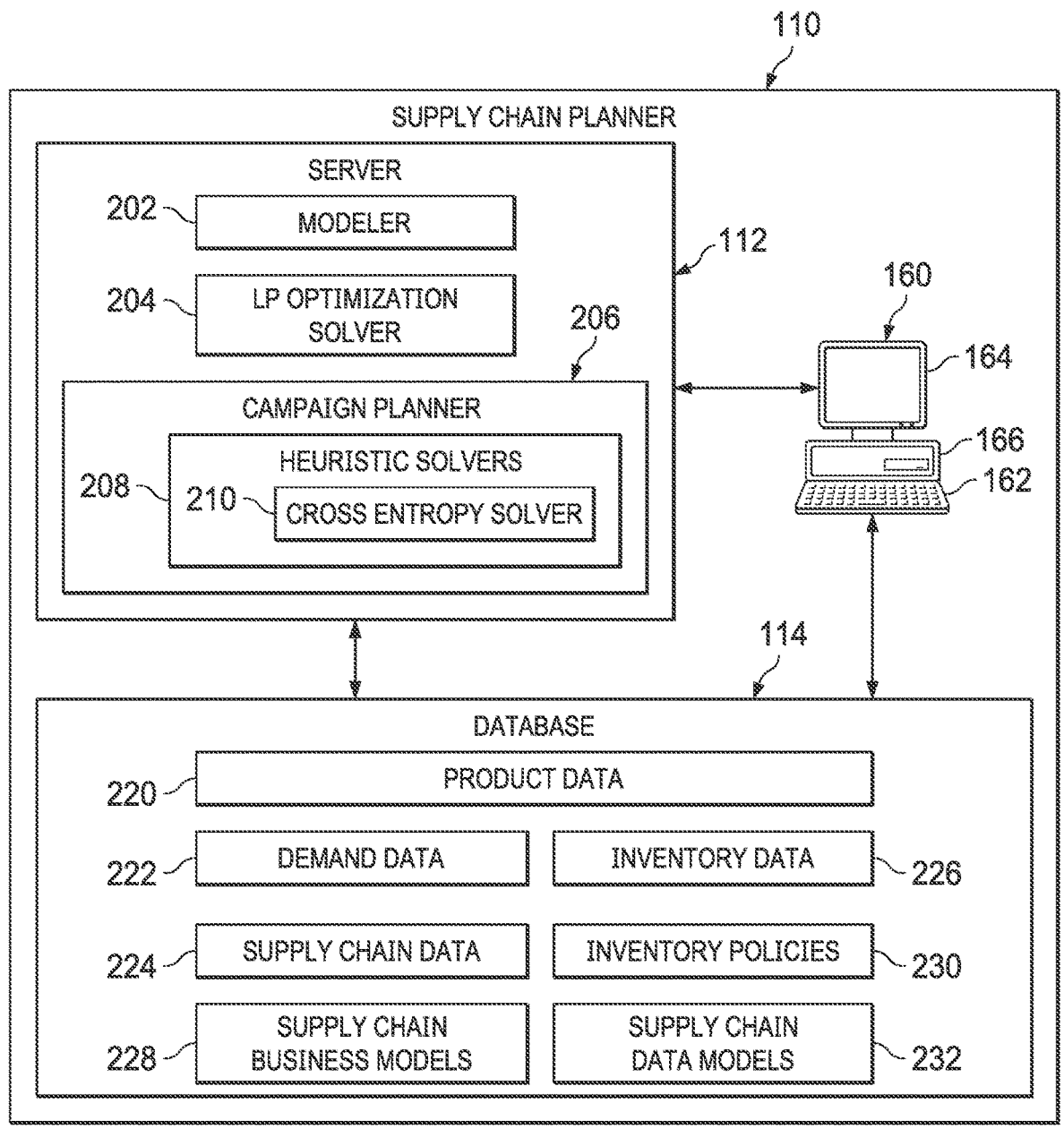
FIG. 2 illustrates the supply chain planner of FIG. 1 in greater detail, according to an embodiment.

FIG. 2 illustrates supply chain planner 110 of FIG. 1 in greater detail, in accordance with an embodiment. As discussed above, supply chain planner 110 may comprise one or more computers 160 at one or more locations including associated input devices 162, output devices 164, non-transitory computer-readable storage media, processors 166, memory, or other components for receiving, processing, storing, and communicating information according to the operation of supply chain network 100. Additionally, supply chain planner 110 comprises server 112 and database 114. Although supply chain planner 110 is shown as comprising a single computer 160, a single server 112, and a single database 114, embodiments contemplate any suitable number of computers, servers, or databases internal to or externally coupled with supply chain planner 110.

Server 112 of supply chain planner 110 may comprise modeler 202, LP optimization solver 204, campaign planner 206, heuristic solvers 208, and cross-entropy solvers 210. Although server 112 is shown and described as comprising a single modeler 202, a single LP optimization solver 204, a single campaign planner 206, one or more heuristic solvers 208, and one or more cross-entropy solver 210, embodiments contemplate any number of modelers, LP optimization solvers, campaign planners, heuristic solvers, and cross-entropy solvers at one or more locations, local to, or remote from supply chain planner 110, such as on multiple servers or computers at any location in supply chain network 100.

Modeler 202 of server 112 identifies resources, operations, buffers, and pathways, and maps supply chain network 100 using supply chain data models 232. Modeler 202 may map the flow of resources and material as pathways connecting operations, item buffers, and resource buffers. In addition, supply chain modeler 202 generates a supply chain planning problem based on the modeled supply chain network 100.

LP optimization solver 204 of server 112 solves supply chain planning problems and generates optimized supply chain plans based on the solution. While solving a supply chain planning problem, LP optimization solver 204 may encounter one or more campaignable resources. According to embodiments, in response to detecting one or more campaignable resources in a supply chain planning problem, LP optimization solver 204 initiates one or more processes for solving a campaign planning problem using campaign planner 206.

According to embodiments, campaign planner 206 models the one or more campaign planning problems as a sequential decision problem with well-defined decision parameters and encodes the required policy of the sequential decision problem into a k-lookahead search strategy by defining a user-specific evaluation function, comprising a weighted sum of features evaluated from the campaign planning problem itself. Supply chain campaign planning problems are formulated as a sequential decision problem by properly defining sequential decision problem components such as, value function, reward, state space, and action set, as described in more detail herein. Once the problem is posed into a sequential decision problem, campaign planner 206 generates a sequence of LP optimization problem and invokes LP optimization solver 204 to solve them. According to embodiments, each LP solution comprises a weighted consumption profile, which decides the campaign selection.

One or more heuristic solvers 208 may be called during supply chain master planning to solve sub-problems, such as campaign planning problems, and provide heuristic solutions to LP optimization solver 206. According to an embodiment, heuristic solvers 208 may include one or more big bucket campaign solvers and one or more cross-entropy solvers 210.

Cross-entropy solvers 210 calculate the parameters associated with an evaluation function that frames an effective objective function to formulate campaign planning as a linear programming problem and solves for parameters of a weighted consumption profile. The disclosed cross-entropy method for identifying the weights of an evaluation function for solving campaign planning problems may initiate parallel campaign planning solves as disclosed below to reduce the amount of time for determining the weights of the evaluation function.

According to embodiments, the one or more engines or solvers of supply chain planner 110 may solve campaign planning problems using cross-entropy campaign planning to automatically determine parameters using one or more supply chain models. In an embodiment, supply chain planner 110 stores and retrieves supply chain master planning problem data, such as, for example, Linear Programming (LP) optimized plans of supply chain network 100 in database 114.

Database 114 of supply chain planner 110 may comprise one or more databases or other data storage arrangement at one or more locations, local to, or remote from, server 112. Database 114 comprises, for example, product data 220, demand data 222, supply chain data 224, inventory data 226, supply chain business models 228, inventory policies 230, and supply chain data models 232. Although, database 114 is shown and described as comprising product data 220, demand data 222, supply chain data 224, inventory data 226, supply chain business models 228, inventory policies 230, and supply chain data models 232, embodiments contemplate any suitable number or combination of these, located at one or more locations, local to, or remote from, supply chain planner 110 according to particular needs.

Product data 220 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 220 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 222 of database 114 may comprise, for example, any data relating to past sales, past demand, purchase data, promotions, events, or the like of one or more supply chain entities 160. Demand data 222 may cover a time interval such as, for example, by the minute, hour, daily, weekly, monthly, quarterly, yearly, or any suitable time interval, including substantially in real time. According to embodiments, demand data 222 may include historical demand and sales data or projected demand forecasts for one or more retail locations, customers, regions, or the like of one or more supply chain entities 150 and may include historical or forecast demand and sales segmented according to product attributes, customers, regions, or the like.

As an example only and not by way of limitation, database 114 stores supply chain data 224, including one or more supply chain master planning problems of supply chain network 100 that may be used by modeler 202, LP optimization solver 204, campaign planner 206, heuristic solver 208, and/or cross-entropy solver 210. Supply chain data 224 may comprise for example, various decision variables, business constraints, goals and objectives of one or more supply chain entities 150. According to some embodiments, supply chain data 224 may comprise hierarchical objectives specified by, for example, business rules, campaign data, master planning requirements along with scheduling constraints and discrete constraints, such as, for example, sequence dependent setup times, lot-sizing, storage, shelf life, and other like constraints.

Inventory data 226 of database 114 may comprise any data relating to current or projected inventory quantities or states, order rules, or the like. For example, inventory data 226 may comprise the current level of inventory for each item at one or more stocking locations across supply chain network 100. In addition, inventory data 226 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 226 in database 114, which may be used by supply chain planner 110 to place orders, set inventory levels at one or more stocking points, initiate manufacturing of one or more items (or components of one or more items), or the like. In addition, or as an alternative, inventory data 226 may be updated by receiving current item quantities, mappings, or locations from one or more imaging devices 120, inventory system 130, transportation network 140, and/or one or more supply chain entities 150.

Supply chain business models 228 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain business models 228 may also comprise characteristics that specify the supply chain structure in even more detail, including, for example, specifying the type of collaboration with the customer (e.g. Vendor-Managed Inventory (VMI)), from which stocking locations or suppliers 152 items may be sourced, customer priorities, demand priorities, how products may be allocated, shipped, or paid for, by particular customers, and the destination stocking locations or supply chain entities where items may be transported. Each of these characteristics may lead to a different supply chain business model 228.

Inventory policies 230 of database 114 may comprise any suitable inventory policy describing the reorder point and target quantity, or other inventory policy parameters that set rules for supply chain planner 110 to manage and reorder inventory. Inventory policies 230 may be based on target service level, demand, cost, fill rate, or the like. According to embodiment, inventory policies 230 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to determine or receive inventory to replace the depleted inventory.

Supply chain data models 232 represent the flow of materials through one or more supply chain entities 150 of supply chain network 100 and may include one or more supply chain master planning problems having at least one campaignable resource. Modeler 202 may model the flow of materials through one or more supply chain entities 150 of supply chain network 100 as one or more supply chain data models 232 comprising a network of nodes and edges. The material storage and/or transition units are modeled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production, processing, or transportation. A planning horizon for supply chain data models 232 may be broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in supply chain network 100.

Figure 3:
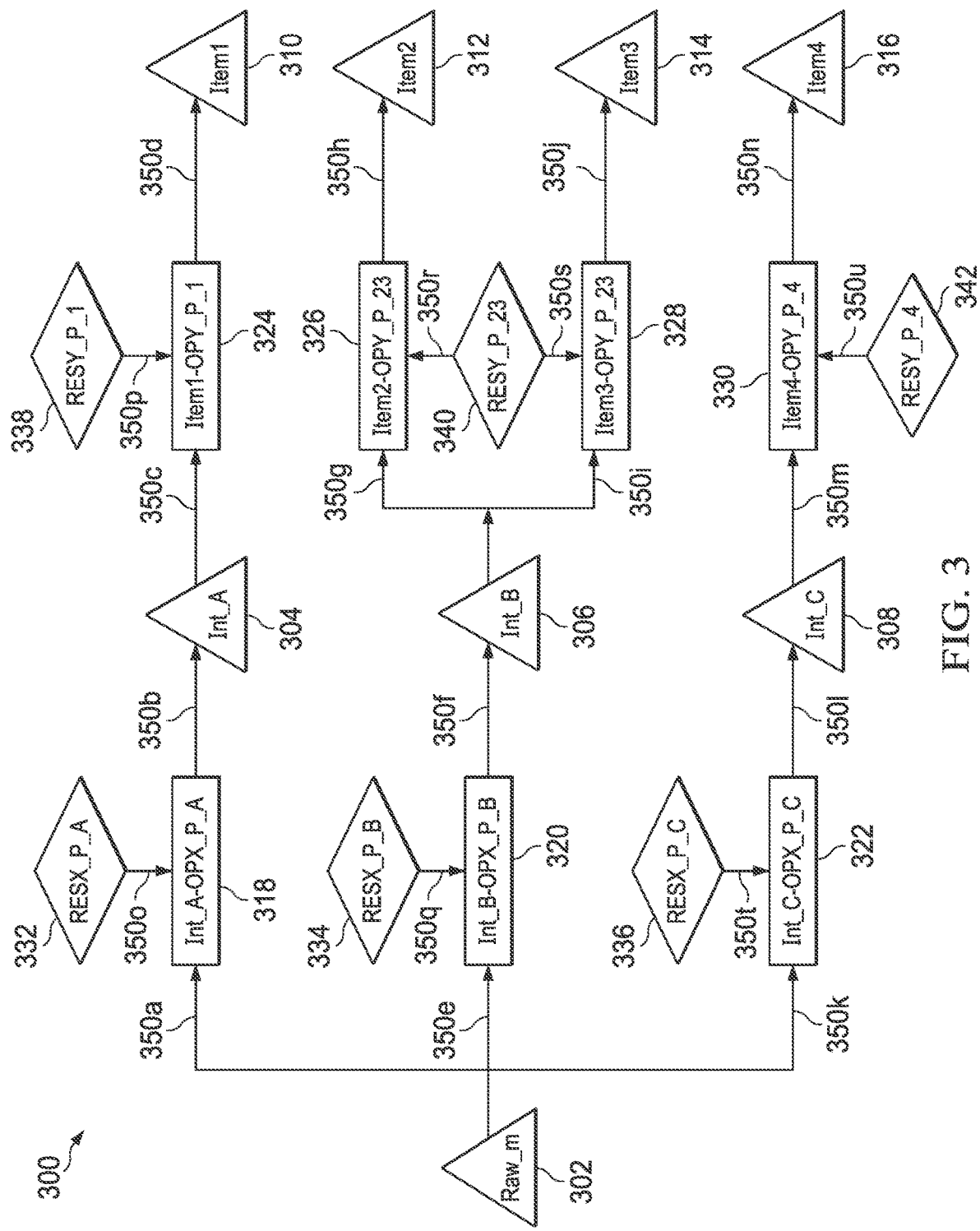
FIG. 3 illustrates an exemplary supply chain network model representing a simplified supply chain, according to an embodiment.

FIG. 3 illustrates exemplary supply chain network model 300 representing a simplified supply chain, according to an embodiment. First exemplary supply chain network model 300 comprises nodes representing: a single raw material buffer (raw material buffer (Raw_m) 302); three intermediate goods buffers (first intermediate good buffer (Int_A) 304, second intermediate good buffer (Int_B) 306, and third intermediate good buffer (Int_C) 308); and four finished good buffers (first finished good buffer (Item1) 310, second finished good buffer (Item2) 312, third finished good buffer (Item3) 314, and fourth finished good buffer (Item4) 316). In exemplary supply chain network model 300, materials flow from upstream nodes to downstream nodes along each of edges 350a-350u from left to right from first raw material buffer 302 to first finished good buffer 310, second finished good buffer 312, third finished good buffer 314, and fourth finished good buffer 316 via first intermediate good buffer 304, second intermediate good buffer 306, and third intermediate good buffer 308.

In addition, edges 350a-350u identify which operations 318-330 process materials from each buffer and which resources 332-342 are consumed. According to some embodiments, operations 318-330 comprise manufacturing processes which receive upstream items, process the upstream items using resources 332-342, and produce downstream items, which may comprise finished goods, or items that require further processing. By way of example only and not of limitation, supply chain network model 300 may represent the manufacture of different colors of glass. Glass manufacturing may comprise one or more campaignable resources, such as, for example, an oven which produces different colors of glass, but only one color of glass at a time. Setup to change the oven from using one color (such as, for example, red, clear, blue, green, or other like colors) to another requires a significant amount of time, which may also be sequence dependent. For example, a setup time to change the oven from production of red glass to clear may comprise a longer setup time than changing the oven from production of clear glass to red glass. Additionally, material is illustrated and described in connection with a downstream flow, flow of materials may be bi-directional (either upstream or downstream), which is difficult to solve by heuristic solver 208, but which may, in some cases, be more quickly solved using LP optimization solver 204.

Simplified supply chain network model 300 begins at an upstream node representing raw material buffer (Raw_m) 302, which receives the initial input for a manufacturing process. Edges 340a, 340e, and 340k identify the destination of the raw material as first operation (Int_A-OPX_P_A) 318, second operation (Int_B-OPX_P_B) 320, and third operation (Int_C-OPX_P_C) 322. Each of these operations (first operation (Int_A-OPX_P_A) 318, second operation (Int_B-OPX_P_B) 320, and third operation (Int_C-OPX_P_C) 322) consumes different resources (first resource (RESX_P_A) 332, second resource (RESX_P_B) 334, and third resource (RESX_P_C) 336 as indicated by edges 350o, 350q, and 350t. The results of first operation (Int_A-OPX_P_A) 318, second operation (Int_B-OPX_P_B) 320, and third operation (Int_C-OPX_P_C) 322 on the raw material is indicated by edges 340b, 340f, and 340l, which show that raw material transported from raw material buffer (Raw_m) 302 to each of first operation (Int_A-OPX_P_A) 318, second operation (Int_B-OPX_P_B) 320, and third operation (Int_C-OPX_P_C) 322 is transformed into three intermediate items stored at first intermediate good buffer (Int_A) 304, second intermediate good buffer (Int_B) 306, and third intermediate good buffer (Int_C) 308. For an exemplary glass manufacturer, these intermediate items may represent different types of unfinished glass that requires further processing, such as, for example, unfinished glass requiring further processing in an oven.

Edges 350c, 350g, 350i, and 350m indicate that the intermediate items from first intermediate good buffer (Int_A) 304, second intermediate good buffer (Int_B) 306, and third intermediate good buffer (Int_C) 308 are processed by fourth operation (Item1-OPY_P_1) 324, fifth operation (Item2-OPY_P_23) 326, sixth operation (Item3-OPY_P_23) 328, and seventh operation (Item4-OPY_P_4) 330. The resulting items from processing the intermediate goods by fourth operation (Item1-OPY_P_1) 324, fifth operation (Item2-OPY_P_23) 326, sixth operation (Item3-OPY_P_23) 328, and seventh operation (Item4-OPY_P_4) 330 are Item1 stored at first finished good buffer (Item1) 310, Item2 stored at second finished good buffer (Item2) 312, Item 3 stored at third finished good buffer (Item3) 314, and Item4 stored at fourth finished good buffer (Item4) 316. Like first operation (Int_A-OPX_P_A) 318, second operation (Int_B-OPX_P_B) 320, and third operation (Int_C-OPX_P_C) 322, fourth operation (Item1-OPY_P_1) 324 and seventh operation (Item4-OPY_P_4) 330 each consume only a single resource: fourth operation (Item1-OPY_P_1) 324 consumes fourth resource (RESY_P_1) 338 as indicated by edge 350*p* and seventh operation (Item4-OPY_P_4) 330 consumes sixth resource (RESY_P_4) 342 as indicated by edge 350*u*. Although fourth resource (RESY_P_1) 338 and sixth resource (RESY_P_4) 342 are each consumed by only a single operation in supply chain network 100 modeled by exemplary supply chain network model 300, fifth resource (RESY_P_23) 340 is consumed by both fifth operation (Item2-OPY_P_23) 326 and sixth operation (Item3-OPY_P_23) 328 as indicated by edges 350*r* and 350*s*. According to embodiments, fifth resource (RESY_P_23) 340 comprises a campaignable resource, which is used by both fifth operation (Item2-OPY_P_23) 326 and sixth operation (Item3-OPY_P_23) 328), but which can only be used with one at a time and requires a significant amount of time for a changeover from a setup for fifth operation (Item2-OPY_P_23) 326 (to produce Item 2) to a setup for sixth operation (Item3-OPY_P_23) 328 to produce Item 3.

Continuing with the exemplary glass manufacturer described above, the campaignable resource represented by fifth resource (RESY_P_23) 340 comprises an oven used to process colored glass, but which may process only one color of glass at a time. Setting up the oven to produce a particular color, requires a significant amount of time, and which may depend on the which color of glass was previously produced in the oven. To calculate a supply chain plan that includes fifth resource (RESY_P_23) 340, or other campaignable resources, campaign planner 206 will perform a heuristic campaign planning process to determine a campaign plan that allocates the campaignable resource based, at least in part, on upstream demands and capacity and material constraints. In response to and based at least partially on a campaign plan, the campaign operations may then produce campaign goods stored at one or more campaign buffers. Continuing with the example of the glass manufacturer, campaign goods may comprise colored glass which is ready for further processing or shipment to one or more customers or supply chain entities 150 including, for example, transporting to one or more further production processes such as, for example, one or more operations for finishing, testing, packaging, transportation, and the like of the campaign goods to produce finished goods which may be held at one or more finished goods buffers. For example, for the exemplary glass manufacturer, final production processes may comprise inspection, measurement, or testing of colored glass for compliance with tolerances or safety requirements. If the colored glass is compliant, it may be marked for sale and transported for distribution to one or more customers or supply chain entities 150 from one or more finished goods buffers by transportation processes for distribution to satisfy demands of one or more customers and/or one or more supply chain entities 150. The exemplary glass manufacturer may initiate one or more transportation processes that transport, package, or ship finished glass to one or more locations internal to or external of one or more supply chain entities 150 of supply chain network 100, including, for example, shipping colored glass directly to consumers, to regional or strategic distribution centers, or to the inventory of one or more supply chain entities 150, including, for example, to replenish a safety stock in an inventory of one or more supply chain entities 150.

Although the simplified supply chain network model 300 is shown and described as having a particular number of buffers 302-316, operations 318-330, and resources 332-342 with a defined flow between them indicated by edges 350*a*-350*u*, embodiments contemplate any number of buffers, resources, and operations with any suitable flow between them, including any number of nodes and edges, according to particular needs. In particular, a supply chain master planning problem typically comprises a supply chain network much more complex than simplified exemplary supply chain network model 300. For example, a supply chain network often comprises multiple manufacturing plants located in different regions or countries. In addition, an item may be processed by many operations into a large number of different intermediate goods and/or finished items, where the different operations may have multiple constrained resources and multiple input items, each with their own lead, transportation, production, and cycle times. Similarly, operations 318-328 of the supply chain network model 300 may be any operation, including operations for manufacturing, distribution, transportation, or other like activities of supply chain entities 150. In one embodiment, additional constraints, such as, for example, business constraints, operation constraints, and resource constraints are modeled and included in a supply chain planning problem and may be added to facilitate other planning rules.

Figure 4:
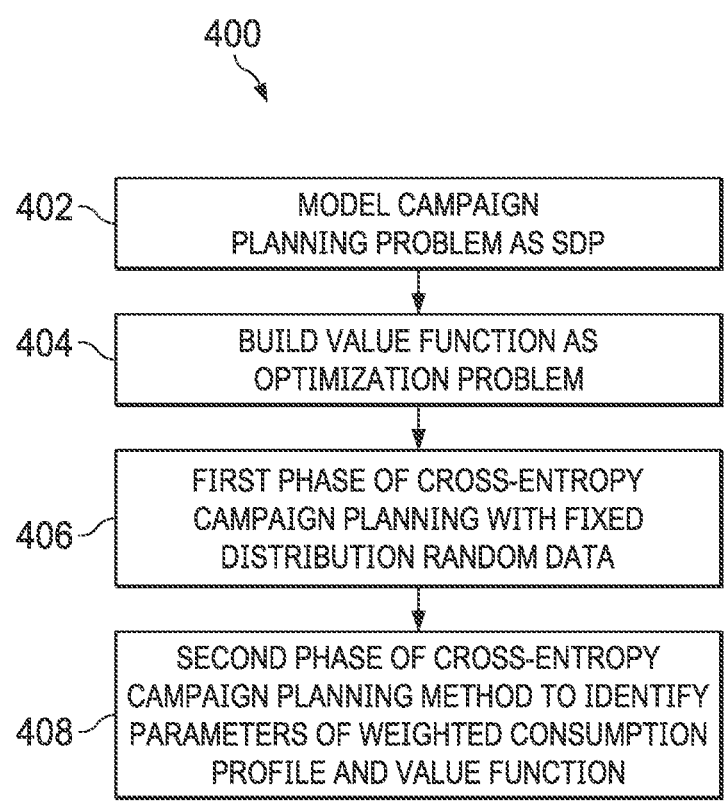
FIG. 4 illustrates an exemplary method of cross-entropy campaign planning, according to a first embodiment.

FIG. 4 illustrates exemplary method 400 of cross-entropy campaign planning, according to a first embodiment. Method 400 of cross-entropy campaign planning proceeds by one or more activities, which, although described in a particular order, may be performed in one or more combinations of the one or more activities, according to particular needs.

At action 402, modeler 202 models a campaign planning problem as an sequential decision problem. A campaign planning problem, such as, for example, a big bucket campaign planning problem, may be formulated as an sequential decision problem. In sequential decision problems, the utility of actions taken by a decision maker do not depend on current decision, expressed with the state (or state-action pair), which the agent would have received, as the result of this decision, but rather on the whole sequence of actions. This sequence of actions is called a policy. In big bucket campaign planning, campaign planner 206 decides an effective campaign selection (action) at each time bucket (decision epoch) and targets a set of key performance indices (KPIs) at the end of the planning. These KPIs may be elements of a suitable utility function. By way of further illustration and not of limitation, an example is now given. The sequential decision problem formulation of a supply chain campaign planning problem may comprise defining the follow variables:

Decision Epoch: T={bktstarts, bktstarts+1, bktstarts+2, . . . , bktend};

State: S=Set of all possible configuration of the weighted consumption profiles for every campaign operations set OP;

Action: A=Set of all permutation of operations which are enabled at a state s. (For example, a=11001 is one of the actions at state s∈ S where there are five campaign operations and, first, second and fifth of them are enabled);

Evaluation Function=Evaluation function for all state action pair: weighted sum of consumption profiles of first k buckets (in case of k-lookahead);

Reward Function: Reward($s_{j,i}$)=max$_{a_q \in}$ As$_{j,i}${Eval($s_{j,i}$, $a_q$)}; and a deterministic transition probability. Given a state $s_t$ and an action set As$_t$ as an input, for each time bucket t, from start until termination of the campaign horizon, campaign planner 206 performs the following action:

$$a_t^* = \arg\min_{a_i \in A_{S_t}} \{\text{Exp}(\text{Reward}(s_t, a_i))\}.$$

Here, $(s_t, a_i)$ is a state obtained by taking an action $a_i$ on state $s_t$.

$a_t^*$ can be extended as, $$a_t^* = \arg\min_{a_i \in A_{s_t}} \sum Prob((s_t, a_i)s_{j,i}) \times Reward(s_{j,i}).$$

$$\begin{Bmatrix} S_{j,i} \in \text{set of possible states generated} \\ \text{after keeping an } OP \text{ value as it is} \\ \text{and disabling others in } (S_t, a_i) \end{Bmatrix}$$

where $Prob((s_t, a_i), s_{j,i})$ is the transition probability from $(s_t, a_i)$ to $s_{j,i}$ and $Reward(s_{j,i})$ is minimum evaluation-value of the possible next state, i.e., $$Reward(s_{j,i}) = \min_{a_q \in A_{s_{j,i}}} \{Eval(s_{j,i}, a_q)\}.$$

The transition probability is deterministic: For each state and action, campaign planner 206 specifies a new state.

In order to achieve the correct sequence of actions, a k-ply (or k-lookahead) search strategy to define an evaluation function of the following form:

$$Eval = w_1 \times f_1 + w_2 \times f_2 + w_3 \times f_3 \ldots + w_d \times f_d$$

where Eval, gives evaluation-values of the given configuration of consumption profiles (state) in the supply chain production plan. It is a linear combinations of the features $(f_1, f_2, f_3, \ldots, f_d)$ weighted by coefficients $(w_1, w_2, w_3, \ldots, w_d)$. According to some embodiments, features comprise a weighted sum of weighted consumption profile and objective values of the campaign metrics of every layer, such as, demand not satisfied, lateness, earliness, and/or inventory evaluated from the LP-optimization run.

At action 404, modeler 202 builds a value function as an optimization problem. According to some embodiments, the value function is approximated by weighted oblevels. In the non-default option, for each required KPI, there is an LP optimizer call within a given time bucket. In the default option, all the KPIs are mapped onto a single metric, which is a weighted linear sum of the KPIs. Therefore, a non-default-based big bucket campaign planner has worse time complexity but much better accuracy than the default-based planner. Campaign planner 206 may use a k-lookahead tree search framework and the evaluation function to obtain a new policy. According to embodiments, the k-lookahead search framework looks k steps ahead down the tree and performs a weighted linear sum of the consumption profile using cross-entropy campaign planning.

At action 406, supply chain planner 110 invokes a first phase of cross-entropy campaign planning to find near optimal weights for consumption profile and value function. A first phase generates a random data sample using some fixed distribution according to the specified problem. Campaign planner 206 received one or more parameters and uses a reward function or utility function to evaluate the successfulness of the set of parameters. The parameters may be sorted according to a reward function that maximizes the oblevels. For example, when choosing a first sample, the planner gives nine inputs, second samples gives nine inputs, and the third sample gives nine inputs. Initially, these nine inputs are different samples sorted according to the highest reward. Taking the most successful results and calculating a mean for each of the weights, for each of the parameters, and the standard deviation for the mean that illustrates the consistency.

At action 408, invokes a second phase of cross-entropy campaign planner wherein campaign planner 110 updates the parameters of the random mechanism based on the data to produce a better sample in the next iteration. The process may then be repeated iteratively. With each iteration, a new mean and standard deviation in each direction and then another sample is generated.

Figure 5:
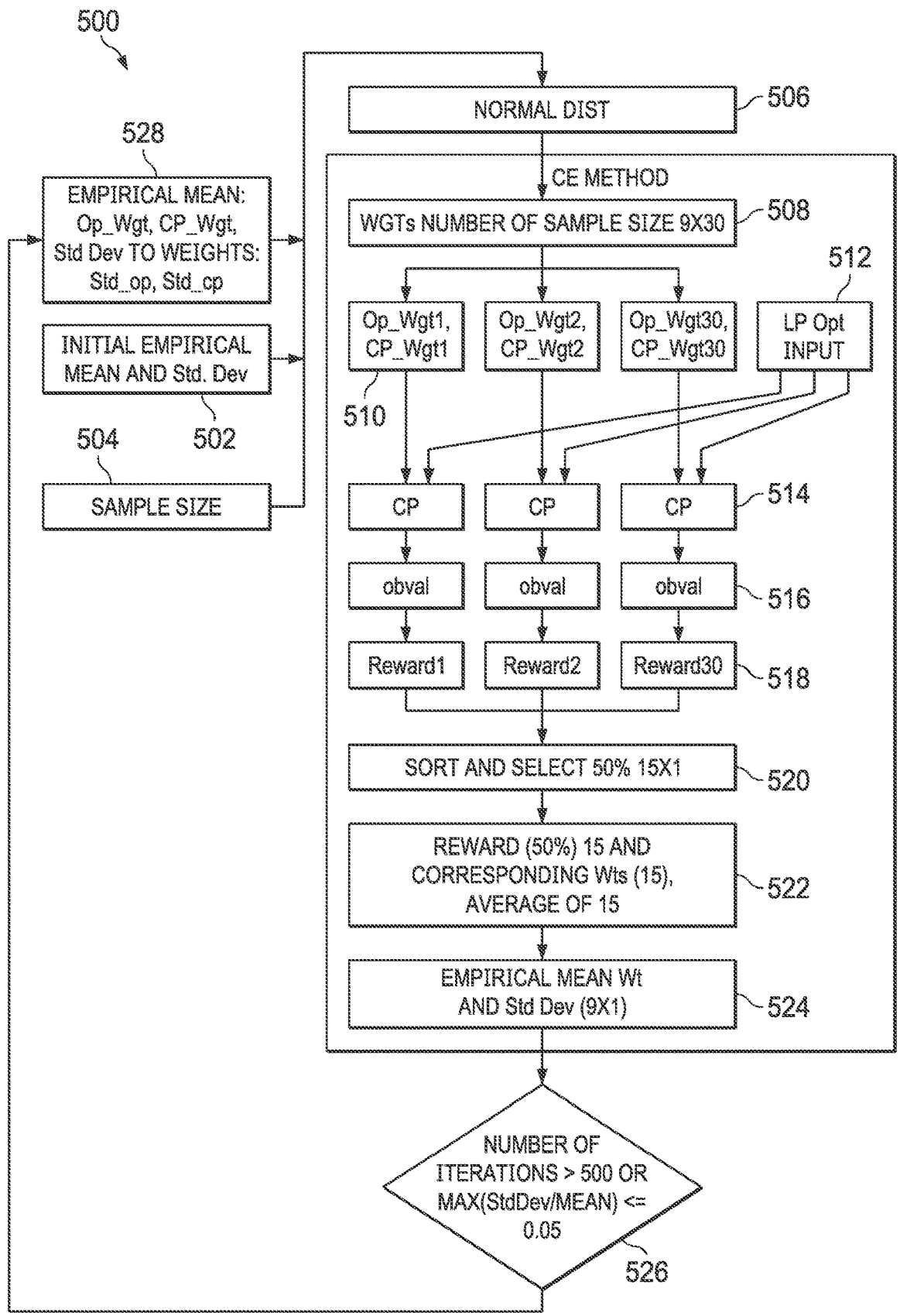
FIG. 5 illustrates an exemplary method of cross-entropy campaign planning, in accordance with a second embodiment.

FIG. 5 illustrates exemplary method 500 of cross-entropy campaign planning, according to an embodiment. As discussed above, cross-entropy campaign planning may comprise an iterative procedure having two phases. During the first phase, cross-entropy campaign planner 206 generates a random data sample (using some fixed distribution) according to a specified problem. During the second phase, cross-entropy campaign planner 206 updates the parameters of the random mechanism based on the data to produce a "better" sample in the next iteration. Method 500 of cross-entropy campaign planning proceeds by one or more activities, which, although described in a particular order, may be performed in one or more combinations of the one or more activities, according to particular needs.

At action 502, campaign planner 206 receives an initial assigned empirical mean and standard deviation for initializing a weighted consumption profile and evaluation function. According to embodiments, campaign planner 206 is initialized and receives initial parameters, mean $\mu_{0i}$ and standard deviation $\sigma_{0i}$, for individuals $w_i$, and iteration t=k. In addition, op_wt comprises a vector of weights of the consumption profile that allows campaign change selection using a weighted sum of daily required supply. Supply chain campaign planner 206 formulates a sequence of linear optimization problems and for each problem, invokes a linear programming solver to solve them. With each linear programming solution, there is an associated metric, which may be referred to as a weighted consumption profile, which decides the campaign selection. In big-bucket campaign planning, weighted consumption profile decides, given the campaign constraints, which operations to disable, enable and stop, regardless of the availability of required capacity and existing demand. For example, for each campaign operation, a weighted consumption profile evaluates a value (using a calculated required supply for each of a first four days), according to: $w_1$*required supply (day1)+$w_2$*required supply (day2)+$w_3$*required supply (day3)+$w_4$*required supply (day4). Selection of parameters associated with this metric is highly sensitive. In addition, or the alternative, the weighted consumption profile is evaluated from some measures such as on-hand inventory, demand and safety stock signals in a predetermined number of future buckets. The weights associated to the metric is user determined.

In addition, CP_wt comprises a vector of weights that determine an evaluation function for campaign planning, such as, for example, a default weighted qualifier in a campaign planning oblevel wherein, $w_1$*demand_not_satisfied+$w_2$*demand_backlog+ $w_3$*total_op_plans+$w_4$*inventory will be used as a guide to heuristically determine the campaign plan.

At action 504, campaign planner 206 receives sample size s. According to embodiments, sample size s comprises a s number of random weights that are generated and evaluated at each iteration of method 500. At action 506, campaign planner 206 generates s number of normalized mean-standard deviation pairs. According to embodiments, campaign planner 206 generates N random sample vectors for every elements in a vector using normal sample distribution with parameter vectors (μk1, μk2, . . . , μks) and (σk1, σk2, . . . , σks).

At action 508, cross-entropy solver 210 begins a cross-entropy phase of method 500 by transmitting one or more samples as an input weight vector to one or more processes of a campaign planner 206. According to embodiments, cross-entropy solver 210 transmits each input weight vector to a separate campaign planning process and/or an LP optimization process, as described in more detail below. At action 512, cross-entropy solver 210 receives an input from LP optimization solver 204 a production planning problem and/or a campaign planning problem of a master production planning problem and transmits the solution and/or input to the one or more campaign planning processes and/or LP optimization processes.

At action 514, cross-entropy solver initializes each sample of the input weight vector may be initialized on a separate instance of campaign planner 206 and/or LP optimization solver 204. According to embodiments, one or more instances of LP optimization solver 204 are initialized and run in parallel on one or more separate processors and/or processor cores. At action 514, each LP optimization solver 204 solves a sequential decision problem-modeled campaign plan using sample weights of the input weight vector.

At action 516, campaign planner 206 evaluates each sample weight vector and generates an evaluated fitness value. According to embodiments, campaign planner 206 generates Obvals, which comprise k-lookahead output values linearly-related to weighted consumption profiles. The evaluated fitness values are linearly-related to Obvals, as discussed above. At action 518, campaign planner 206 computes a reward value for each generated input sample weight vector based on an evaluation function that returns a corresponding output value. By way of example only, and not of limitation, for each sample input weight vector, an output value sample j, an output value is equal to the negative of the objective function value of a campaign planning formulation.

At action 520, campaign planner 206 sorts sample vectors by generated output values and the top 50% of samples are selected According to an embodiment, campaign planner 206 chooses, at each iteration, thirty sample vectors and, further, invokes thirty instances of runs with each sample vector, as described above in accordance with action 514.

At action 522, campaign planner 206 generates rewards for each sample run. Campaign planner 206 may evaluate sample quality based on the generated rewards. By way of example only and not by way of limitations, the exemplary illustrated embodiment indicates that selecting 50% of the samples which have the lowest rewards, and utilizing these samples for the calculation to compute means and standard deviations, which will be selected for the next iteration.

At action 524, campaign planner 206 computes the empirical mean vector and standard deviation vectors. According to embodiments, campaign planner 206 computes the empirical mean vector and standard deviation vector from the top fifteen sample vectors, which correspond to 50% of the selected rewards, are used to compute. Continuing with the exemplary illustrated embodiment, the empirical mean vector and standard deviation vector comprise vectors of size 9×1 containing empirical mean and standard deviation of nine weights, which are used by campaign planner 206 to populate sample weight vectors during subsequent iterations of the cross-entropy method.

At action 526, campaign planner evaluates one or more stop criteria. according to embodiments, stop criteria comprise one or more of a maximum number of iterations and a maximum value of a standard deviation divided by mean, such as, for example, a maximum value less than or equal to 0.05. At action 528, empirical mean weight and standard deviation from action 524 are concerted to a vector and the process returns to action 506. Method 500 may continue until evaluation at action 526 indicates one or more stop criteria is reached.

Using a big bucket campaign planner avoids modeling campaign setups and replaces the campaign setups and associated campaign constraints by: (1) restricting the maximum number of operations running in a time-bucket for a user defined group of operations; (2) restricting the maximum changes in a set of operations that are running from one time-bucket to next over the user defined group of operations; and (3) limiting the minimum production quantity produced per bucket. These three non-campaign setup constraints may be heuristically imposed during a linear program solve, and big bucket campaign planning is an effective heuristic for solving many campaign planning problems, but it faces two major challenges. First, the total number of LP solvers that are required by big bucket campaign planning is proportional to the quantity of campaign buckets. As described herein, big bucket campaign planning imposes campaign constraints bucket-wise, then re-solves the LP, meaning that each bucket requires at least one LP solver call, which is computationally heavily expensive. Second, the plan quality obtained from big bucket campaign planning is highly sensitive and mainly depends upon the choice of weights chosen for the consumption profile and default weights associated to campaign objective function evaluation. Big bucket campaign planners unfortunately do not determine weights effectively, but instead rely on users to manually select weights based on expert intuition.

Figure 6:
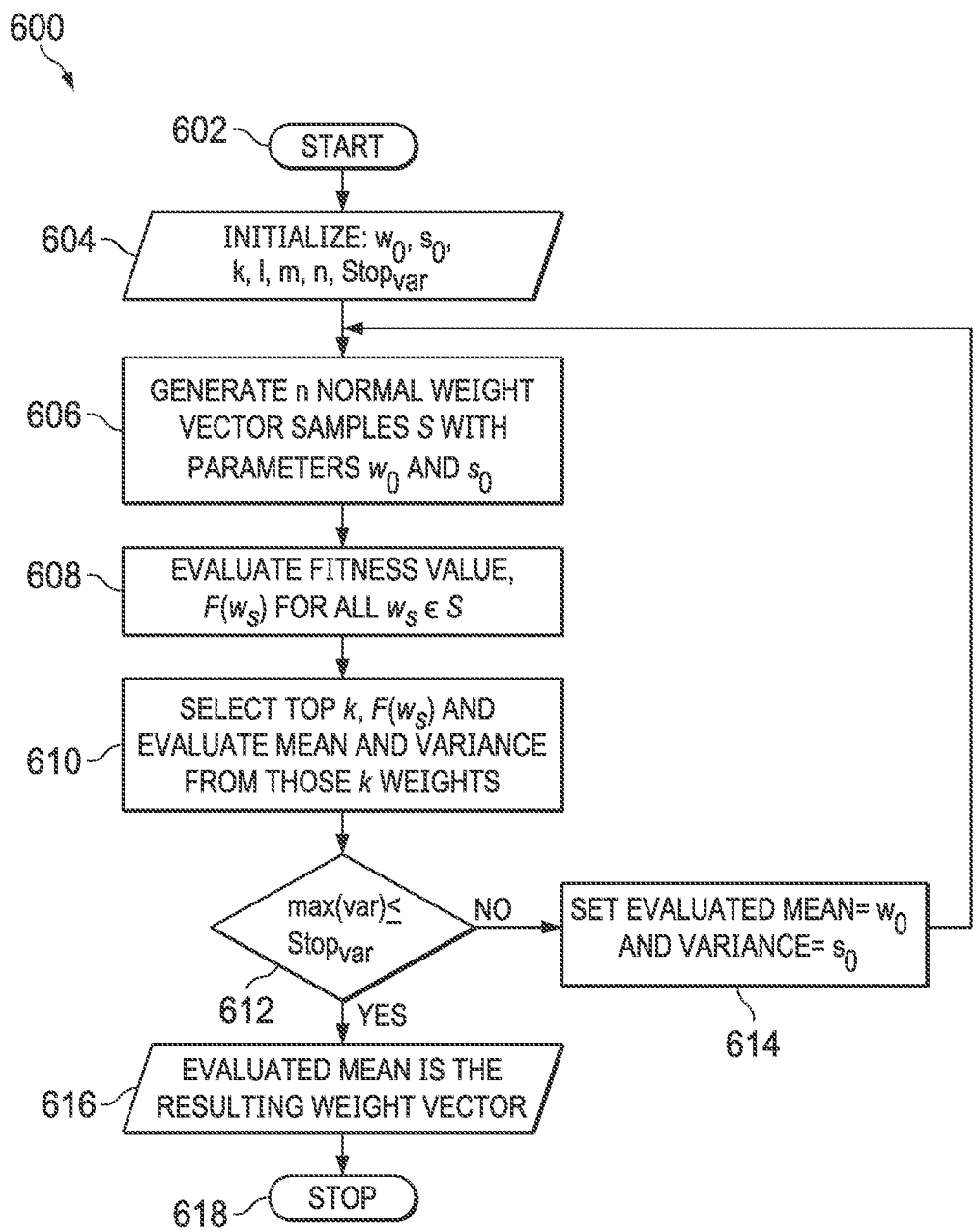
FIG. 6 illustrates an exemplary method of cross-entropy campaign planning weight learning, according to an embodiment.

FIG. 6 illustrates exemplary method 600 of cross-entropy campaign planning weight learning, according to an embodiment. According to method 600, campaign planner 206 uses cross-entropy to determine weights for big bucket campaign planning without expert intuition. At action 602, campaign planner 206 begins method 600 of cross-entropy campaign planning weight learning. According to embodiments, method 600 comprises campaign planner 206 learning parameters for weighted consumption profile and/or evaluation function. Method 600 of cross-entropy campaign planning weight learning proceeds by one or more activities, which, although described in a particular order, may be performed in one or more combinations of the one or more activities, according to particular needs.

At action 604, campaign planner 110 initializes initial parameters for mean weights vector $w_0$, standard deviations vector so, and one or more other variables, as described herein. As described above, mean weights $w_0$ comprises an initial guess of the unknown mean parameters to the normal distributions. Campaign planner 206, receives mean weights $w_0$, which is a vector of initial weights assigned to build weighted consumption profile and evaluation function, wherein $w_0 = w_{01}, w_{02}, \ldots, w_{0c}, w_{0c+1}, w_{0c+2}, \ldots, w_{0c+d}$, contains c weights for initializing weighted consumption profile and d weights for initializing evaluation function. Embodiments contemplate excluding d weights when performing non-default big-bucket campaign planning, as discussed in more detail below. The standard deviation, $s_0$, comprises a vector of standard deviations associated to the elements of $w_0$. The i'th pairs ($w_{0i}, s_{0i}$) such that $w_{0i} \in w_0$ and $s_{0i} \in s_0$ corresponds to the empirical mean and standard deviation to the i'th normal random distribution. After each iteration, campaign planner 206 updates a new vector of mean, standard deviation pairs. After a long run, the empirical mean vector $w_0$, converges to a true mean vector. Note that, a better selection of initial means and standard deviation vectors leads to faster convergence of campaign planning to the best possible solution.

Using an expert-selected $w_0$ and $s_0$ implicitly gives a prior belief that is dependent to the previous plan quality of campaign runs. Expert suggested weights associated to consumer profile should be in decreasing order over the horizon, i.e., weight associated to current bucket should be assigned a higher value than the weight associated to the next bucket. Similarly, weights associated to objective function campaign planning should be assigned the weights proportional to the priority given to the respective KPIs. For example, a weight associated to unsatisfied demand may be greater than a weight associated with lateness.

At action 606, campaign planner 206 uses input values to generate s normal weight samples for a number of iterations itrn: Each iteration for the number of iterations itrn generates s random weight vector samples generated using a normal distribution with mean vector $w_0$ and standard deviation vector so, wherein mean vector and standard deviation vector comprise different mean weights associated to consumption profile and campaign planning objective function, and given each set of mean-standard deviation pair as normal parameters, campaign planner 206 generates s number of random weights. According to a particular implementation, the value of s is set to 45, although other values of s may be selected according to particular needs.

At action 608, campaign planner 206 evaluates one or more fitness values, for each of the samples of random weight vectors. In the present embodiment, fitness values comprise the reward values evaluated after exporting the random weight vector to campaign planner 206.

At action 610, campaign planner 206 selects sub-sample k of top fitness values to evaluate a mean and variance of the sample weight vectors. According to embodiments, sub-sample k represents the best samples to be chosen to evaluate the empirical mean and empirical standard deviation, wherein the best samples represent those samples with the lowest evaluation function values for a minimization objective function. At action 612, campaign planner 206 evaluates whether a maximum variation max(var) is less than or equal to $Stop_{var}$. When max(var) is less than or equal to $Stop_{var}$, method 600 continues to action 614, otherwise method 600 continues to action 616.

According to embodiments, $Stop_{var}$ comprises stopping criteria comprising one or more of a maximum number of iterations (if convergence is computationally expensive) or an evaluation of whether standard deviation is near or equal to a lower bound. By way of example only and not by way of limitation, a lower bound of a standard deviation may be set at a value of 0.00002. Accordingly, when campaign planner 206 evaluates a maximum of the elements of standard deviation vector and determines it equals a value lower than 0.00002, campaign planner 206 ends method 600 of cross-entropy campaign planning. According to a second non-limiting example, a large data-set may comprise a stopping criterion of a maximum number of iterations, such as, for example, a maximum of 200 iterations. Although particular values for a lower bound and a maximum number of iterations are described, embodiments contemplate other suitable values for a lower bound or a maximum number of iterations, according to particular needs.

At action 614, campaign planner 206 sets the evaluated mean to initial weight vector $w_0$ and variance as $s_0$. After completing action 614, method 600 returns to action 606 using the calculated values of weight vector $w_0$ and variance $s_0$. Returning to action 612, when campaign planner 206 evaluates max(var) and max(var) is not less than or equal to $Stop_{var}$, method 600 continues to action 616, where campaign planner 206 sets the evaluated mean as the resulting weight vector. According to embodiments, campaign planner 206 evaluates the resulting weight vector and sets the optimal weight choices for the consumption profile and evaluation function according to the calculated weights of the resulting weight vector. At action 618, campaign planner 206 ends method 600.

Figure 7:
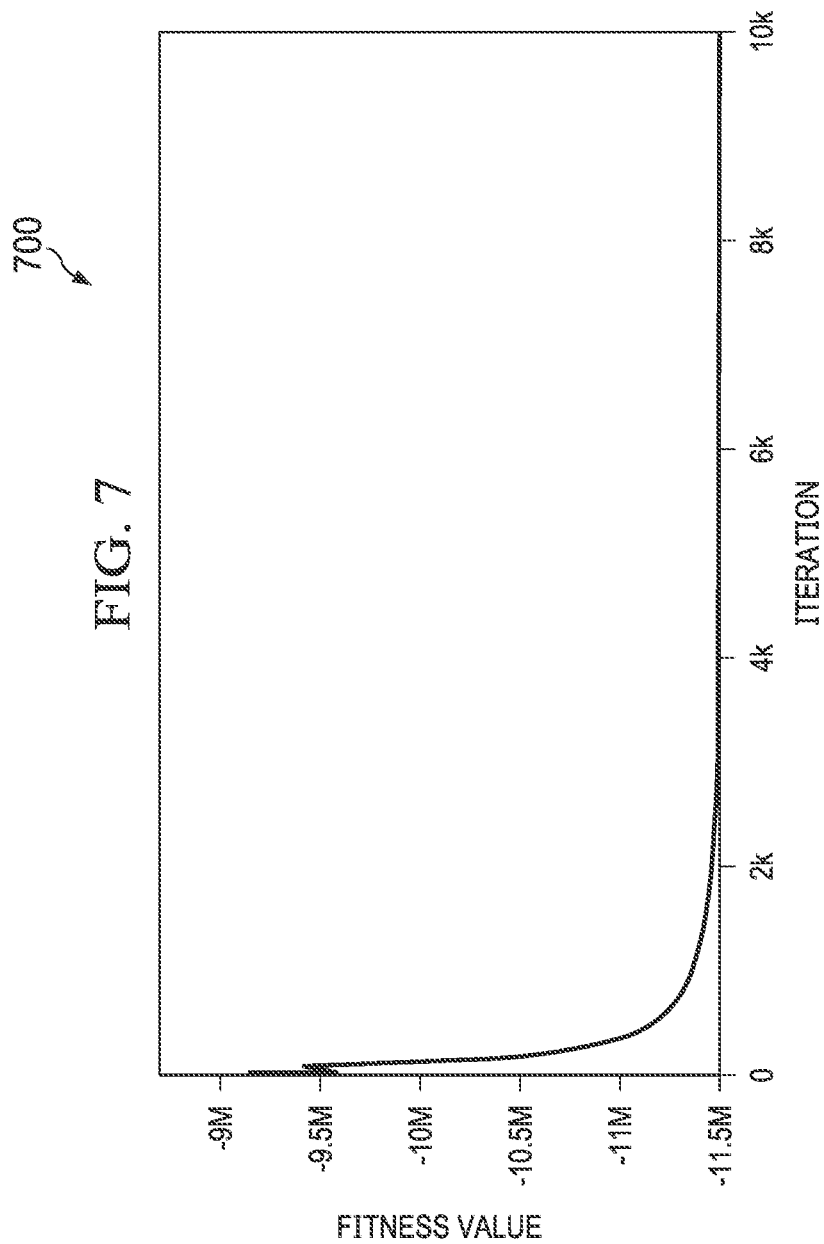
FIG. 7 illustrates an exemplary plot of evaluation value convergence for successive iterations of cross-entropy based selection of big bucket campaign planning according to the method of FIG. 6, according to an embodiment.

FIG. 7 illustrates exemplary plot 700 of evaluation value convergence for successive iterations of CE-based selection of big bucket campaign planning according to method 600 of FIG. 6. according to an embodiment. Plot 700 comprises a convergence plot illustrating that the result converges to the best possible plan quality and was obtained from running a big-bucket campaign planner with a small data set. For a large data set, weight learning is challenging requiring an hour (or more) to complete one run. If the standard cross-entropy campaign planning method is applied and it requires (for example) an average of five thousand runs to converge the evaluation function and return the weights, the whole run would take at least five thousand hours, i.e. 208 day, which is not a practical waiting time for the result.

Figure 8:
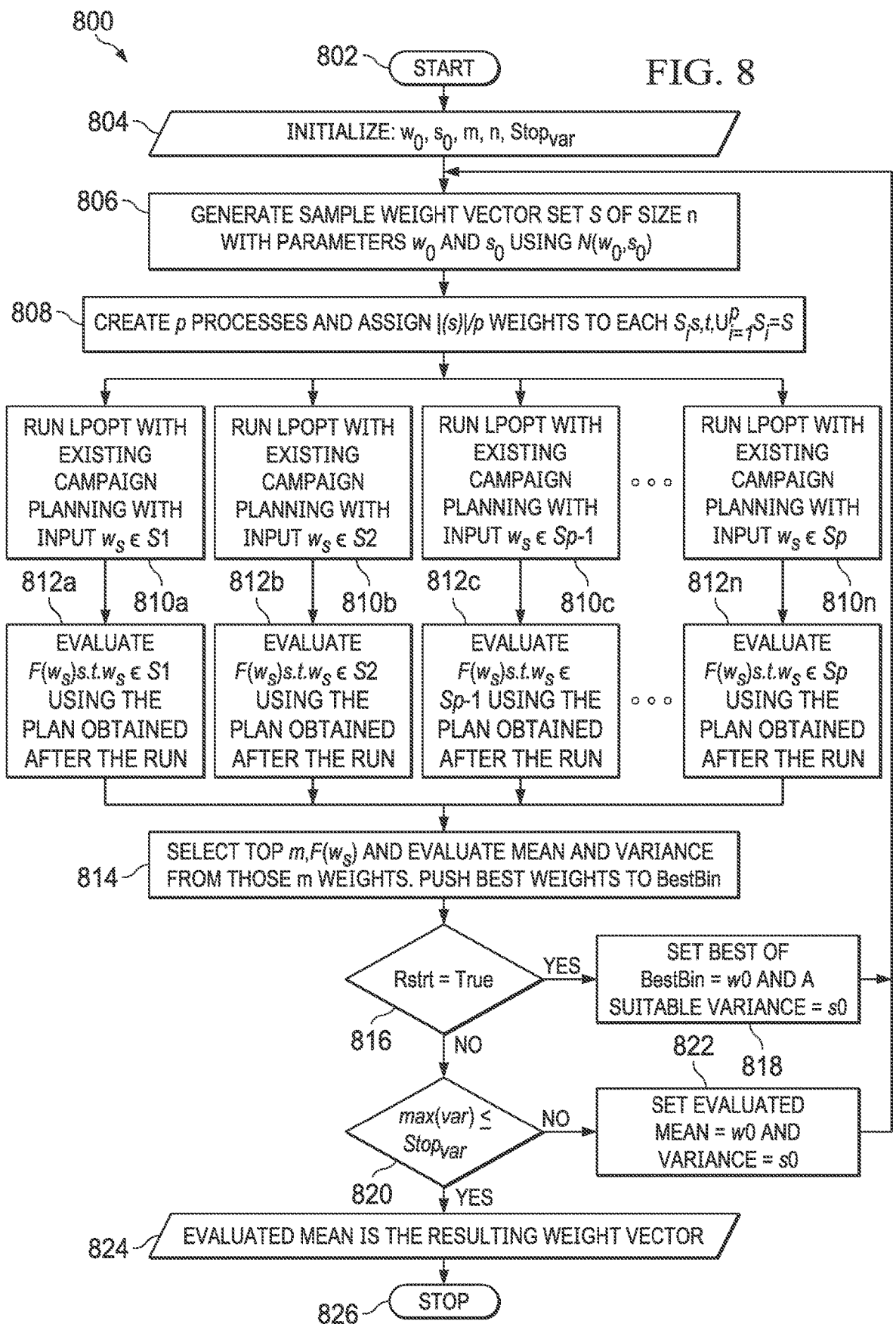
FIG. 8 illustrates an exemplary method of modified cross-entropy campaign planning method comprising multiple cross-entropy campaign planning sub-methods executed on multiple parallel instances of a campaign planner, in accordance with an embodiment.

FIG. 8 illustrates exemplary method 800 of modified cross-entropy campaign planning method comprising multiple cross-entropy campaign planning sub-methods executed on multiple parallel instances of campaign planner 206, in accordance with an embodiment. Method 800 of modified cross-entropy campaign planning proceeds by one or more activities, which, although described in a particular order, may be performed in one or more combinations of the one or more activities, according to particular needs.

At action 802, campaign planner 206 starts method 800. At action 804 campaign planer 206 initializes initial weights vector $w_0$, standard deviations vector $s_0$, and initial variables m, n, and $Stop_{var}$, and p a user-selected number of parallel campaign planners 206. At action 806, campaign planner 206 generates sample weight vector set S of size n with parameters $w_0$ and so using normal distribution of ($w_0$, $s_0$). At action 808, campaign planner 206 creates p processes and assigns |(s)|/p sample weight vectors to each smaller sample weight vector set $S_i$ such that $U_{i=1}^{p} Si = S$. Now every process $p_i$ can invoke parallelly CPs with Si as the input, which improves execution speed of method 800.

At actions 808a-808n, campaign planner 206 invokes p number of processes to perform parallel operations of LP optimization solver 204 with campaign planner 206 and input weight w(s) belongs to S(1) through S(p). At actions 812a-812n, campaign planner 206 evaluates a fitness value for Sample s(1) through S(p) using the plan obtained after the run. Each individual campaign planning method which runs for a given weight sample remains independent to the others makes the implementation fairly convenient and effective for parallelism. The output obtained per sample run may be saved separately. A corresponding memory overhead may be compensated for in order to speed up the computational time for achieving the best possible weights. In addition, the memory overhead may comprise handles if the same could be run in the distributed environment.

At action 814, campaign planner 206 selects top m number of fitness values, evaluates the mean and variance from the m weights, and pushes best weights to a set, BestBin. The set BestBin records the best weight vector evaluated at every iteration, which provides for tracking the weight vector which returns a best reward at a given iteration. At action 816, Rstrt variable is evaluated. According to an embodiment, RSTRT comprises a flag used for restarting method 800 with a new input weight vector. In some instances, executing method 800 may take longer than expected, which may indicate the solution is trapped into local optima. When the Rstrt variable is true, method 800 continues to action 818 where campaign planner 206 searches for new feasible space that may be better than a current local optima by: pausing at a pre-selected iteration sets best of BestBin as initial weight vector $w_0$, and sets a suitable variance as $s_0$. After completing action 818, method 800 returns to action 806 using the new values of weight vector $w_0$ and variance $s_0$.

Returning to action 816, when the Rstrt variable is evaluated and does not equal true (e.g. Rstrt variable is false), method 800 continues activity 820, where campaign planner 206 evaluates whether max(Var) is less than or equal to $Stop_{var}$. When max(Var) is less than or equal to $Stop_{var}$, method 800 continues to action 822, where campaign planner 206 sets evaluated mean to initial weight vector $w_0$ and variance as $s_0$. After completing action 822, method 800 returns to action 806 using the new values of weight vector $w_0$ and variance $s_0$.

Returning to action 820, when campaign planner 206 evaluates max(var) and max(var) is not less than or equal to $Stop_{var}$, method 800 continues to action 824, where campaign planner 206 sets the evaluated mean as the resulting weight vector. According to embodiments, campaign planner 206 evaluates the resulting weight vector and sets the optimal weight choices for the consumption profile and evaluation function according to the calculated weights of the resulting weight vector. At action 826, campaign planner 206 ends method 800.

Modified campaign planning with cross-entropy calculation of parameters of weighted consumption profile and evaluation function of method 800 returns an effective set of weights and hence builds an improved big-bucket campaign planner. To test the improvement of method 800, the results of method 800 implemented with the Conti large data set, which takes approximately one hour to run big bucket campaign planning problem in a non-default case according to method 800. According to embodiments, a non-default option provides better plan quality than a default option in the big bucket campaign planning according to method 800. In the non-default option, for each required KPI, there is an LPOPT call within a given time bucket. In the default option, all the KPIs are mapped onto a single metric, which is a weighted linear sum of the KPIs. Therefore, the non-default-based big bucket planner has worse time complexity but much better accuracy than the default-based planner.

FIG. 9 illustrates chart 900 comparing expert-based weight selection and CE-based weight selection for production planning using big bucket campaign planning of an exemplary dataset representing a global supply chain network, according to an embodiment. Specifically, the results indicate that the plan quality is much improved in the learning-based (cross-entropy) method 800 over an expert-based method (manual-selection of weights). In this example, two KPIs, amount not satisfied and backlog, are given higher priority than others. The evaluation function used in the effective weights evaluation, allows the user to alter the priority of KPIs. Here, for the given data set, layerl is given more priority than layer 2; layer 2 is given more priority than layer 3; and so on. Within each layer, the decreasing order priority is set as amount not satisfied, backlog, alternates, earliness, inventory, and the like. This table shows setting up a priority order results in a dramatic improvement. The time taken to solve the default-based improved big bucket planning according to method 800 is approximately ten to eleven times faster than a non-default-based planner using expert-selection of weights. The results obtained after applying the learned weights into the existing big bucket planner provides an optimal solution. In addition, including a minimum run time constraint, the default-based improved big bucket planner performs much better with respect to both time and accuracy. The minimum run time is an optional constraint which imposes a lower bound on the consecutive time spent for a particular SKU production.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of campaign planning, comprising:
 a computer, comprising a processor and a memory, configured to:
  model a use of the one or more campaign operations and one or more campaignable resources of a supply chain network comprising a production line configured to produce one or more products using one or more campaign operations and one or more campaignable resources as one or more campaign planning problems;
  define an evaluation function comprising a weighted sum of features evaluated from the campaign planning problem;
  initialize weights to build a consumption profile and evaluation function;
  determine fitness values, wherein the fitness values indicate a level of variability;
  evaluate reward values based on the fitness values;
  select a sub-sample of the top fitness values having the best associated objective function;
  repeat the determine, the evaluate and the select steps to adjust the weights until a stopping criterion is met indicating an optimal solution has been reached; and
  determine a campaign plan for the use of the one or more campaign operations and one or more campaignable resource.

2. The system of claim 1, wherein the one or more campaign planning problems are formulated as a sequential decision problem with sequential decision problem components including value function, reward, state space, and action set.

3. The system of claim 1, wherein the one or more campaignable resources include resources for one or more manufacturing setups to produce the one or more products for the campaign plan.

4. The system of claim 3, wherein the one or more manufacturing setups are sequence dependent.

5. The system of claim 1, wherein the campaign plan balances KPI's comprising customer service level, resource utilization and inventory level.

6. The system of claim 5, wherein the campaign plan determines when to change from one campaign to another and the duration of each campaign while balancing the KPI's.

7. The system of claim 1, wherein the modeling of the use of the one or more campaign operations and the one or more campaignable resources of a supply chain network further comprise modelling a flow of materials through the supply chain network as a network of nodes and edges.

8. A computer-implemented method of campaign planning, comprising:
 modeling, by a computer, the use of the one or more campaign operations and one or more campaignable resources of a supply chain network comprising a production line configured to produce one or more products using one or more campaign operations and one or more campaignable resources as one or more campaign planning problems;
 defining an evaluation function comprising a weighted sum of features evaluated from the campaign planning problem;
 initializing weights to build a consumption profile and evaluation function;
 determining fitness values, wherein the fitness values indicate a level of variability;
 evaluating reward values based on the fitness values;
 selecting a sub-sample of the top fitness values having the best associated objective function;
 repeating the generating, the evaluating and the selecting steps to adjust the weights until a stopping criterion is met indicating an optimal solution has been reached; and
 determining, by the computer, a campaign plan for the use of the one or more campaign operations and one or more campaignable resource.

9. The computer-implemented method of claim 8, wherein the one or more campaign planning problems are formulated as a sequential decision problem with sequential decision problem components including value function, reward, state space, and action set.

10. The computer-implemented method of claim 8, wherein the one or more campaignable resources include resources for one or more manufacturing setups to produce the one or more products for the campaign plan.

11. The computer-implemented method of claim 10, wherein the one or more manufacturing setups are sequence dependent.

12. The computer-implemented method of claim 8, wherein the campaign plan balances KPI's comprising customer service level, resource utilization and inventory level.

13. The computer-implemented method of claim 12, wherein the campaign plan determines when to change from one campaign to another and the duration of each campaign while balancing the KPI's.

14. The computer-implemented method of claim 8, wherein the modeling of the use of the one or more campaign operations and the one or more campaignable resources of a supply chain network further comprise modelling a flow of materials through the supply chain network as a network of nodes and edges.

15. A non-transitory computer-readable medium embodied with software for campaign planning, the software when executed:
 models the use of the one or more campaign operations and one or more campaignable resources of a supply chain network comprising a production line configured to produce one or more products using one or more campaign operations and one or more campaignable resources as one or more campaign planning problems;
 defines an evaluation function comprising a weighted sum of features evaluated from the campaign planning problem;
 initializes weights to build a consumption profile and evaluation function;
 determine fitness values, wherein the fitness values indicate a level of variability;
 evaluates reward values based on the fitness values;
 selects a sub-sample of the top fitness values having the best associated objective function;
 repeats the generates, the evaluates and the selects steps to adjust the weights until a stopping criterion is met indicating an optimal solution has been reached; and
 determines a campaign plan for the use of the one or more campaign operations and one or more campaignable resource.

16. The non-transitory computer-readable medium of claim 15, wherein the one or more campaign planning problems are formulated as a sequential decision problem with sequential decision problem components including value function, reward, state space, and action set.

17. The non-transitory computer-readable medium of claim 15, wherein the one or more campaignable resources include resources for one or more manufacturing setups to produce the one or more products for the campaign plan.

18. The non-transitory computer-readable medium of claim 17, wherein the one or more manufacturing setups are sequence dependent.

19. The non-transitory computer-readable medium of claim 15, wherein the campaign plan balances KPI's comprising customer service level, resource utilization and inventory level.

20. The non-transitory computer-readable medium of claim 19, wherein the campaign plan determines when to change from one campaign to another and the duration of each campaign while balancing the KPI's.

* * * * *